United States Patent
Lin

(10) Patent No.: US 10,432,442 B2
(45) Date of Patent: Oct. 1, 2019

(54) MULTIPLE STREAM TRANSMISSION METHOD COMPRISING MULTICARRIER MODULATION SELECTION ACCORDING TO THE ASSOCIATED COMMUNICATION TYPE

(71) Applicant: Orange, Paris (FR)

(72) Inventor: Hao Lin, Cesson-Sevigne (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 15/739,559

(22) PCT Filed: Jun. 23, 2016

(86) PCT No.: PCT/FR2016/051542
§ 371 (c)(1),
(2) Date: Dec. 22, 2017

(87) PCT Pub. No.: WO2016/207555
PCT Pub. Date: Dec. 29, 2016

(65) Prior Publication Data
US 2018/0183641 A1   Jun. 28, 2018

(30) Foreign Application Priority Data

Jun. 24, 2015  (FR) .................................... 15 55824

(51) Int. Cl.
*H04L 27/26*   (2006.01)
*H04L 25/03*   (2006.01)
*H04W 4/70*   (2018.01)

(52) U.S. Cl.
CPC ...... *H04L 27/264* (2013.01); *H04L 25/03834* (2013.01); *H04L 27/2634* (2013.01);
(Continued)

(58) Field of Classification Search
CPC ............... H04L 27/2614; H04L 27/264; H04L 27/2698; H04L 27/263; H04L 27/362;
(Continued)

(56) References Cited

U.S. PATENT DOCUMENTS

| 8,666,000 B2 | 3/2014 | Eliaz et al. |
| 2004/0086027 A1* | 5/2004 | Shattil ............... H04L 25/03834 375/146 |

(Continued)

FOREIGN PATENT DOCUMENTS

| EP | 1603295 A2 | 12/2005 |
| EP | 1835682 A2 | 9/2007 |
| WO | 2014016677 A1 | 2/2012 |

OTHER PUBLICATIONS

English translation of the Written Opinion of the International Searching Authority dated Nov. 11, 2016 for corresponding International Application No. PCT/FR2016/051542, filed Jun. 23, 2016.

(Continued)

*Primary Examiner* — Jung Liu
(74) *Attorney, Agent, or Firm* — David D. Brush; Westman, Champlin & Koehler, P.A.

(57) ABSTRACT

A method for transmitting multiple communications of different types, in particular sporadic (MTC) or cellular (broadband) communication including symbols to be transmitted, corresponding to communication services implementing a modulation having M subcarriers of the FBMC-OQAM or OFDM-OQAM type. The method uses linear frequency filtering of a sequence of length N including symbols having L coefficients that are parametrizable according to the communication, L, N, and M being natural numbers, so as to generate N+L−1 symbols, reducing out-of-band spurious emissions. The method also uses, no matter what the communication is, a single frequency/time transform (IFFT) having a size M, where N<M. For sporadic (Continued)

communications (MTC) in a lower frequency band, the constraints on the out-of-band side-lobes are more stringent on the filter and FBMC modulation is thus better adapted.

11 Claims, 7 Drawing Sheets

(52) U.S. Cl.
CPC ...... *H04L 27/2647* (2013.01); *H04L 27/2698* (2013.01); *H04W 4/70* (2018.02)

(58) Field of Classification Search
CPC ... H04L 27/34; H04L 25/0204; H04L 25/021; H04L 25/0242; H04L 25/0244; H04L 25/0256; H04L 25/03038; H04L 25/03159; H04L 25/0206; H04L 2025/0342; H04L 2025/03426; H04L 2025/03522; H04B 7/0456; H04B 7/0845
See application file for complete search history.

(56) References Cited

U.S. PATENT DOCUMENTS

| | | | | |
|---|---|---|---|---|
| 2004/0228392 | A1* | 11/2004 | Zhang | H04L 25/0204 375/148 |
| 2006/0193373 | A1* | 8/2006 | Agee | H04B 1/69 375/141 |
| 2013/0195041 | A1* | 8/2013 | Papasakellariou | H04W 72/042 370/329 |
| 2015/0181575 | A1* | 6/2015 | Ng | H04L 5/0092 370/329 |
| 2017/0134203 | A1* | 5/2017 | Zhu | H04B 7/0456 |
| 2017/0163463 | A1* | 6/2017 | Werner | H04L 5/0007 |

OTHER PUBLICATIONS

International Search Report dated Nov. 11, 2016 for corresponding International Application No. PCT/FR2016/051542, filed Jun. 23, 2016.

Written Opinion of the International Searching Authority dated Nov. 11, 2016 for corresponding International Application No. PCT/FR2016/051542, filed Jun. 23, 2016.

Schellmann Malte et al., "FBMC-based air interface for 5G mobile: Challenges and proposed solutions". 2014 9th International Conference on Cognitive Radio Oriented Wireless Networks and Communications (CROWNCOM), ICST, Jun. 2, 2014 (Jun. 2, 2014), pp. 102-107, XP032616104.

Vadde V et al., "Partial response signaling for enhanced spectral efficiency and RF performance in OFDM systems". GLOBECOM '01: IEEE Global Telecommunications Conference; San Antonio, Texas. USA, Nov. 25-29, 2001, IEEE Operations Center, Piscataway, NJ, vol. 5, Nov. 25, 2001 (Nov. 25, 2001), pp. 3120-3124, XP010747384.

E V Hhi et al, "The 5GNOW Project Consortium groups the following organizations: Partner Name Short name Country Fraunhofer-Gesellschaft zur Foerderung der Angewandten Forschung 5G Waveform Candidate Selection The 5GNOW Project Consortium groups the following organizations: Partner Name Short name Country Fraunhofe", Nov. 21, 2013 (Nov. 21, 2013), XP055175081.

Lin Hao, "Flexible Configured OFDM for 5G Air Interface" IEEE Access, vol. 3, Oct. 19, 2015 (Oct. 19, 2015), pp. 1861-1870. XP011588143.

M. Bellanger et al., "FBMC Physical layer : a primer", PHYDYAS, Jun. 2010.

3GPP TSG RAN Meeting #64, "Motivation for new WI on Low Complexity and Enhanced COverage LTE UE for MTC", Sophia Antipolis, France, Jun. 10-13, 2014.

\* cited by examiner

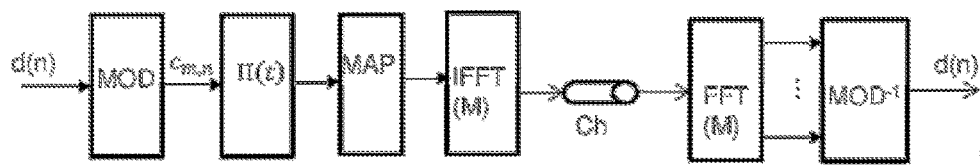
Fig.1
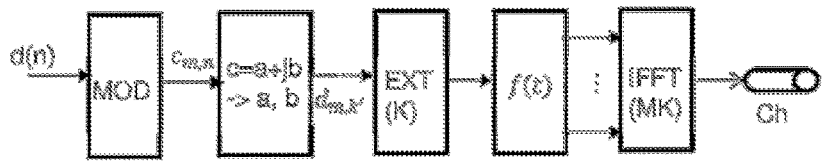
Fig.2
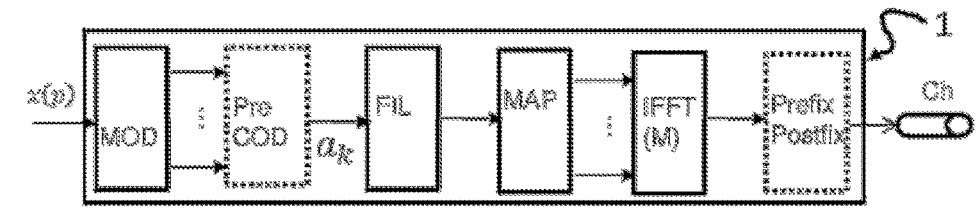
Fig.3a
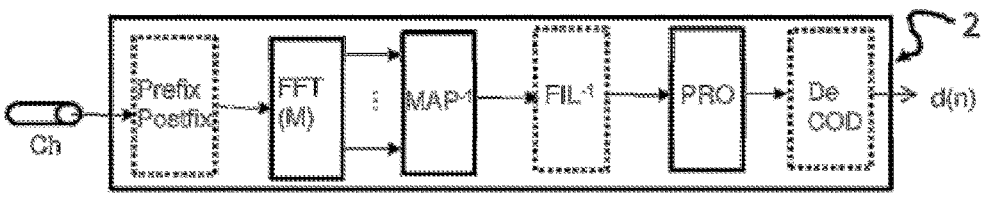
Fig.3b
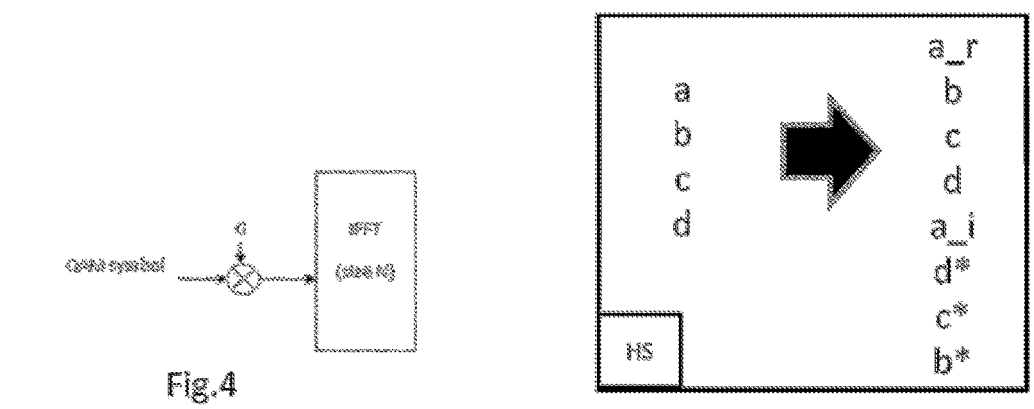
Fig.4
Fig.6

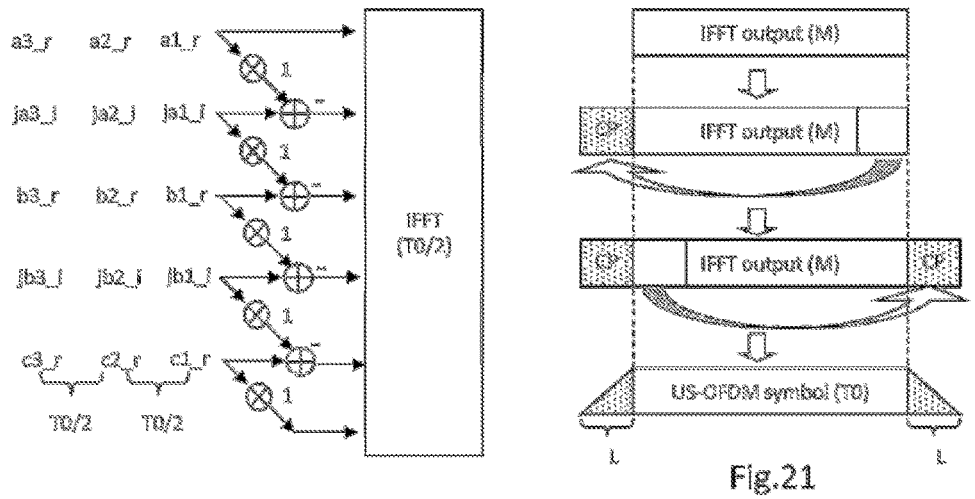
Fig.20
Fig.21
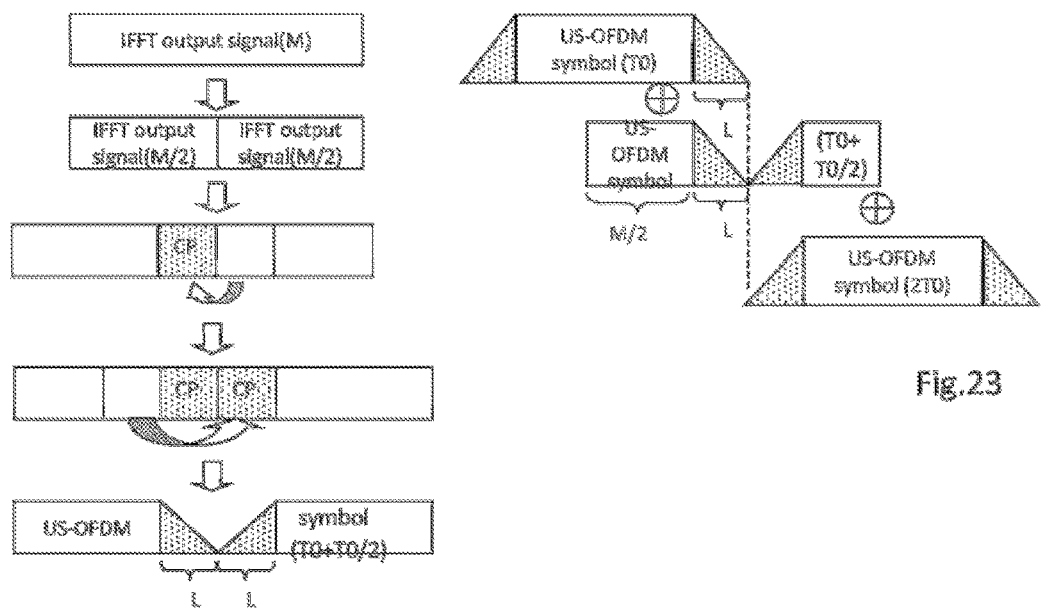
Fig.22
Fig.23

MULTIPLE STREAM TRANSMISSION METHOD COMPRISING MULTICARRIER MODULATION SELECTION ACCORDING TO THE ASSOCIATED COMMUNICATION TYPE

CROSS-REFERENCE TO RELATED APPLICATIONS

This Application is a Section 371 National Stage Application of International Application No. PCT/FR2016/051542, filed Jun. 23, 2016, which is incorporated by reference in its entirety and published as WO 2016/207555 A1 on Dec. 29, 2016, not in English.

FIELD OF THE INVENTION

The field of the invention is that of communications implementing a multicarrier modulation.

The invention notably finds applications in the field of wireless or wired communications, implementing a multicarrier modulation, e.g. for LTE/LTE-A cellular communications, for WiFi, WiMAX wireless communications, for PLC, ADSL wired communications, and for DVB-T, DVB-T2, DVB-H, DVB-NGH broadcasting.

In particular, the invention finds applications in future generation systems (5G, etc.) for which there will be simultaneous transmission between high-throughput cellular communications, upstream or downstream, known as MBB (English acronym for "Mobile Broadband Communications") and low-throughput upstream sporadic communications associated with "IoT" (English acronym for "Internet of Things") sensors or "MTC" (English acronym for "Machine Type Communications") or V2X (Vehicle-to-Vehicle/Infrastructure communications) communications.

PRIOR ART

In the coming years, a densification is expected of sensor networks the role of which is to feed back data to an entity for using these data. There are already existing networks of video-surveillance cameras which feed back video data. There are other networks being deployed in very varied fields such as energy, involving the feedback of gas or electricity consumption data and such as health, involving the feedback of patient physiological data. There is therefore a predictable increase in information transmissions that will pass through the same physical link which will often be a radio link. Sensors are usually considered as static unlike cellular communication terminals.

The marketing of connected vehicles is also expected offering Internet applications grouped under the term V2X service. According to some envisaged scenarios, communications take place between two vehicles moving in the opposite direction and at high speed, between a vehicle and a base station or between a vehicle and a relay. In any event, the quality of service must be guaranteed even when the vehicle's movement is fast.

An MTC service i.e. associated with sporadic communications requires that the MTC device has a very low power consumption in order to ensure a battery life of up to about ten years. Moreover, the cost price of the MTC device must be very low, which means that its hardware complexity must be very limited. Another important constraint of the MTC service is having a particularly low signaling cost given that more than 100 000 devices may be connected within a single cell.

For the MBB service i.e. associated with high-throughput cellular communications known as MBB spectral efficiency is very important. Cellular communications are understood as being implemented with mobile broadband transmission systems. Quality of service is another equally very important factor for the user. On the other hand, power consumption is a less critical criterion than for the MTC service.

3GPP thus defines rules [3GPP] for a base station to be able to simultaneously receive communications from mobile terminals that require almost permanent connectivity with a high or even very high throughput (several Megabits/s) and sporadic communications from sensors. The transmissions from the sensors also have the particular feature of being low throughput (a few bits/s, about 20 bytes per day), and being of a random and intermittent nature.

MTC communications are based on a transmission chain similar to that specified for MBB communications. Thus the modulation is an OFDM multicarrier modulation and each entity transmits during a certain number of time intervals ("time slots").

The transmission chain of an OFDM modulation illustrated in baseband by FIG. 1 includes a binary to symbol modulation MOD and a frequency time transformation implemented by means of an IFFT (Inverse Fast Fourier Transform). The complex symbols $c_{m,n}$ resulting from the modulation are mapped as input to the transformation over the different subcarriers. The size M of the IFFT determines the subcarrier number and the output OFDM signal band. The conventional OFDM signal is written in baseband:

$$s(t) = \frac{1}{\sqrt{T_0}} \sum_{m=0}^{M-1} \sum_{n=-\infty}^{\infty} c_{m,n} f(t-nT_0) e^{j2\pi m F_0 t} \text{ with}$$

$$f(t) = \Pi(t) = \begin{cases} 1 & \text{if } -\frac{T_0}{2} \leq t < \frac{T_0}{2} \\ 0 & \text{else} \end{cases}$$

$f(t)$ is termed a prototype function, m is the subcarrier index, n is the time index, $j^2=-1$, $T_0$ is the duration of a complex symbol $c_{m,n}$.

The prototype function of the conventional OFDM modulation is a rectangular filtering $\Pi$ of a duration $T_0$ equal to the inverse of the inter-subcarrier spacing $F_0$.

OFDM modulation has many advantages and is recognized as being well suited to 5G, i.e. the post LTE-advanced 3GPP standards (R14 and following). In particular, the construction of the OFDM modulation allows an easy insertion of the pilots. Moreover, channel estimation is easily achievable at reception either from distributed pilots, or from a preamble and MIMO transmission with an OFDM signal is effective.

However, it is also recognized that OFDM modulation is not best suited for MTC communications in particular due to the fact that the frequency response of the gate function H is a cardinal sine which spreads out the spectrum of the OFDM signal.

FBMC (Filter Bank Multi Carrier Modulation) modulation is known and it is recognized that it has the advantage of obtaining a signal with a less spread out spectrum than that of the OFDM signal.

The main techniques used for generating an FBMC multicarrier signal are FS-FBMC ("Frequency Sampling-FBMC") and PPN-FBMC ("PolyPhase Network-FBMC"). These different techniques are notably described in the document [Bellanger].

The FS-FBMC construction illustrated in FIG. 2 is distinguished from the OFDM construction in that after the binary symbol modulation MOD, the real parts $d_{m,k}$, and the imaginary parts $d_{m,k}$, of the complex symbols $c_{m,k}$ are processed separately; they are subsequently referred to as real symbols. k=0, 1, . . . , N−1 with N the number of complex symbols at the input and k'=0, 1, . . . , 2N−1. Moreover, the real symbols $d_{m,k}$, are spread out by an extender: each real symbol $d_{m,k}$, of index k' is repeated 2K−1 times with K the overlapping factor of the prototype filter with K>1. At the output of the extender EXT, the real symbols are filtered, i.e. multiplied by the coefficients of a filter $f(t)$. Finally, the filtered symbols are mapped to the input of the frequency time transformation which is of size MK. The FS-FBMC construction uses an IFFT block the size of which is K times that of the IFFT block of OFDM.

At reception, the time frequency transformation is implemented with an FFT of size MK. The output symbols are filtered and then the symbols $d_{m,k}$, are reconstituted by adding K filtered symbols.

As for the FS-FBMC construction, the construction technique PPN-FBMC distinguishes the real part from the imaginary part of the complex symbols in order to process them as real symbols. On the other hand, it does not use an extender and uses an IFFT block identical to that of OFDM. But it uses a polyphase filter block termed PPN (PolyPhase Network) after the IFFT block.

According to FBMC modulation, the subcarriers of the frequency time transform are modulated by real values representative of the real and imaginary parts of a complex symbol.

Compared with OFDM modulations, FBMC, FS-FBMC and PPN-FBMC modulations generate a signal that is better localized in frequency and offer better spectral efficiency. This makes them more robust for asynchronous communications such as MTC communications. Moreover, FBMC modulations are better suited than conventional OFDM modulation for V2X services since they have a better Doppler resistance. But FBMC modulations are often regarded as too complex. Indeed, one of the particular features is that successive temporal symbols generated at the IFFT output temporally overlap thus creating intrinsic interference between successive symbols. This overlap is derived from an up-sampling effect that takes place in the construction of the FBMC signal. Consequently, channel estimation and the transmission of a MIMO signal are more onerous for an FBMC signal than for an OFDM signal.

There is therefore a need for a multiservice transmission technique, the services belonging to the list including at least sporadic communications, high-throughput cellular communications and V2X communications making it possible to combine the advantages of OFDM and FBMC modulations and in particular which is simple and flexible for generating a configurable form of OFDM (shaped OFDM) modulation for the services in the list. This technique should make it possible to flexibly switch from a simultaneous transmission of streams of data respectively associated with different services belonging to the preceding list to a transmission of one or more streams associated with the same service.

DISCLOSURE OF THE INVENTION

The invention provides a multiple stream transmission method for transmitting symbols to be transmitted corresponding to different types of communications notably of MTC sporadic type or of MBB cellular type implementing a modulation with M subcarriers.

Thus, the method uses a linear frequency filtering of a sequence of length N including symbols, with L coefficients that are parameterizable according to the communication type, L, N and M being natural numbers, for generating N+L−1 symbols and whatever the service it uses the same frequency time transform of size M, N<M.

The subject matter of the invention is also a multiple stream telecommunication device implementing a multicarrier modulation with M subcarriers. This device, which may well be both a base station and an access point, e.g. a WiFi access point or a mobile terminal, includes a linear frequency filter with L coefficients that are parameterizable according to the communication type for generating N+L−1 symbols from a sequence of length N including symbols and it includes a common frequency time transformer of size M whatever the service, L, N and M being natural numbers, N<M.

The subject matter of the invention is also a multiple stream telecommunication reception method implementing a multicarrier modulation with M subcarriers. The method uses the same time frequency transform of size M and, under the control of a received signaling message encoding a parameterization used in transmission, it uses a linear frequency filtering the inverse of a linear filtering used in transmission.

The subject matter of the invention is also a multiple stream telecommunication receiver implementing a multicarrier modulation with M subcarriers. The receiver includes the same time frequency transform of size M and, under the control of a received signaling message encoding a parameterization used in transmission, it further includes a linear frequency filter the inverse of a linear filter used in transmission.

According to one embodiment the invention provides a multiple stream transmission method for transmitting symbols to be transmitted corresponding to different types of communications notably of sporadic type and of cellular type implementing a multicarrier modulation whatever the communication type using the same frequency time transform associated with a band of size M, N<M. The method uses a linear frequency filtering of a sequence of length N including symbols, with L coefficients that are parameterizable according to the communication type, L, N and M being natural numbers, for generating N+L−1 symbols, the sequence of symbols being capable of being sampled at a frequency of 1/T0 or sampled at a frequency of 2/T0, the frequency time transform uses the highest frequency and the sequence sampled at a frequency of 1/T0 is stretched in time to reach a temporal length T0 before filtering, T0 being an integer.

The invention provided thus makes it possible to generate both a conventional OFDM modulation and an FBMC modulation by modifying the parameterization of the filter according to the communication type. The telecommunication device thus very easily supports the services corresponding respectively to MBB communications, MTC communications and V2X communications.

In particular, the multicarrier modulation is FBMC for MTC sporadic communications and OFDM for MBB cellular communications.

The multiple stream method is capable of transmitting in the same multicarrier symbol resulting from the frequency time transform symbols associated with different services and in particular an MTC service and an MBB service.

Given the linear nature of the filter, the method can preequalize the phase change introduced by the filter. Thus, the receiver more easily cancels out the intercarrier interference introduced by the filter.

According to one embodiment of the transmission method the filtered symbols are mapped to the input of the frequency time transform and, during a framing, a first and a second formatted cyclic prefix are added to a multicarrier symbol obtained at the output of the transform.

According to one embodiment of the transmission method the symbols N are precoded before being filtered, the precoding preequalizing a phase shift effect of the filtering.

According to one embodiment of the transmission method the coefficients of the filter are equal to $\{1, -w\}$ with $w \in [0,1]$, L=2. According to one embodiment, w=0, the symbols to be transmitted are complex and the sequence of length N is composed of N complex symbols to be transmitted. This embodiment makes it possible to obtain a conventional OFDM modulation.

According to one embodiment of the transmission method, the filtered symbols are mapped to the input of the frequency time transform and the method further includes a mapping of pilots to the input of the frequency time transform. This embodiment makes it possible to obtain an OFDM modulation compatible with the existing 3GPP LTE standards (with QAM signaling).

According to one embodiment of the transmission method, $w \neq 0$, the symbols to be transmitted are complex and the sequence of length N is composed of successions of the real part and the imaginary part of the symbols to be transmitted.

According to one embodiment of the transmission method, the method further includes an insertion of complex pilots into the sequence of N symbols before the filtering such that for the same pilot of form $P_r + jP_i$ its real part $P_r$ is inserted in the form $-P_r/w$ and its imaginary part is inserted thereafter in the form $jP_i$. This embodiment (with QAM signaling) makes it possible to obtain a formatted OFDM modulation (shaped-OFDM) with a pilot pattern compatible with the existing 3GPP LTE standards.

According to one embodiment of the transmission method, the method includes the transmission of a signaling message encoding the parameterization.

According to one embodiment of the transmission method, multiple sequences of symbols are processed in parallel with a parameterization for each different communication type associated with the sequences and the processed sequences are mapped to the input of the same frequency time transform each on a sub-band of the M subcarriers, the number of symbols being able to be different between the sequences.

LIST OF FIGURES

Other features and advantages of the invention will become apparent during the following description made with reference to the appended figures, given by way of a non-restrictive example.

FIG. 1 is a diagram of the transmission and reception chain of a conventional OFDM modulation.

FIG. 2 is a diagram of the transmission chain of an FBMC modulation.

FIGS. 3a and 3b are diagrams of the main processing implemented respectively at transmission and reception according to the multiple stream transmission method provided.

FIG. 4 is a diagram of the precoding at transmission according to one embodiment of the invention corresponding to a modulation with QAM symbols.

FIG. 6 is a diagram of the function HS of the precoding in FIG. 5.

FIG. 20 is a diagram illustrating the rate for FBMC modulation.

FIG. 21 is a diagram illustrating the addition of cyclic prefixes onto a symbol at the IFFT output which combines the MTC or V2X and MBB services.

FIG. 22 is a diagram illustrating the addition of cyclic prefixes onto a symbol at the IFFT output which is only composed of the MTC or V2X service.

FIG. 23 is a diagram of the summation with overlapping between successive symbols after the addition of cyclic prefixes.

DESCRIPTION OF EMBODIMENTS OF THE INVENTION

The transmission technique according to the invention is illustrated in FIGS. 3a and 3b. The multiple stream transmission method 1, 2 corresponding to different communication types uses a linear frequency filtering with L parameterizable coefficients according to the communication type, L and M being natural numbers. Such a linear filtering is a linear convolution: $y(p)=\Sigma_{n=0}^{L-1} x(p-n) \times f(n)$ of the input samples $x(p)$ with the coefficients of a filtering function $f(n)$. Moreover, whatever the communication type the method uses the same frequency time transform of size M commonly termed IFFT.

The modulated symbols, e.g. QAM complex symbols, resulting from the modulation MOD are grouped by block of N or sequence of symbols of length N, N<M. Optionally, the symbols are precoded by a precoder PreCOD. They are then filtered by a linear filter FIL with L coefficients in the frequency domain. The linear filtering consists of a linear convolution. Thus, if the input sequence has a length N then the filtered sequence has a length N+L-1, N+L-1 M. L-1 is known as the convolution tail; it reduces the spectral efficiency. In noting $a_j$ with $j \in [0, N-1]$, the precoded symbols then the filtered symbols $y_k$ with $k \in [0, N+L-1]$ are expressed in the form:

$y_k = \Sigma_{l=0}^{L-1} f_l \times a_{k-l}$ with $f_l$ the coefficients of the filter, $l \in [0, L-1]$.

The filtered symbols are then mapped by a mapper MAP to the input of the IFFT frequency time transform of size M.

The filtering introduces interference between the subcarriers. A precoding may then be introduced to allow the receiver to cancel out the interference more easily. Since the filtering is linear, the function of the precoding is to pre-equalize the phase of the filter.

In the case of a modulation constructed with QAM symbols, the precoding amounts to weighting the symbols with a coefficient G and then transforming them with an IFFT frequency time transform as illustrated in FIG. 4. The coefficient G has the value:

$$G = \frac{H_{ef}^*}{|H_{ef}|}$$

with $H_{ef}$ the frequency coefficients of the equivalent filter. The equivalent filter is different from the filter at transmission if there is a filtering at reception. For example, if the filter at reception is sinusoidal then the frequency coefficients are $\{1, -w\}$. When there is no filtering at reception then $H_{ef}=DFT(\{1, -w\}, N)$ with DFT a discrete Fourier transform of size N equal to the length of the sequence of symbols $a_j$ at the input of the precoder. When there is a filtering at reception of the type in FIG. 7b, then $H_{ef}=DFT(\{-w,1+w,-1\}, N)$. The outputs of the IFFT then feed into the transmission filter.

Figure 5:
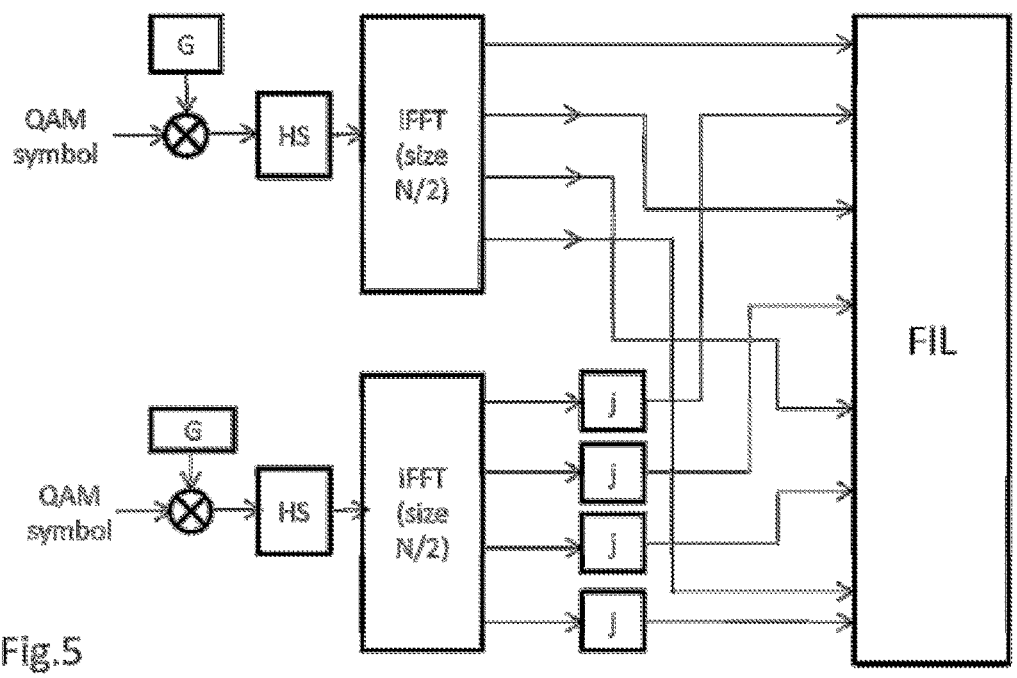
FIG. 5 is a diagram of the precoding at transmission according to one embodiment of the invention corresponding to a modulation with OQAM symbols.

In the case of a modulation constructed with OQAM symbols, the precoding is illustrated in FIG. 5. FIG. 6 gives the details of the box HS in FIG. 5. The modulated QAM input symbols are considered to be distributed into two paths and weighted with a coefficient G. The weighted symbols are then arranged in a manner similar to that illustrated in FIG. 6 when the input sequence includes N/4=4 modulated symbols, a, b, c and d by paths. The output sequence of each path is transformed by an IFFT of size N/2. The output samples have real values. The outputs of one of the two IFFTs are multiplied by j to obtain imaginary values. The outputs of the other IFFT and the imaginary values are directed to the transmission filter input.

The parameterization of the linear filter meets the constraints imposed on the transmitted signal, in particular the required shape of the spectrum, relating to the corresponding communication service. In particular, a broadcasting service, e.g. the MBMS service specified by 3GPP LTE, requires a more robust filter against the effects of spreading than a "conventional" voice communication service.

Figure 7A:
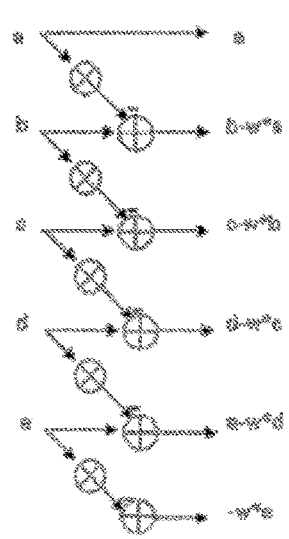
FIGS. 7a and 7b are diagrams of examples of the structure of the transmission and reception filters respectively for a sequence of N=5 symbols, coefficients of the filters equal to $\{1, -w\}$ and an OFDM modulation according to one embodiment of the invention.
Figure 7B:
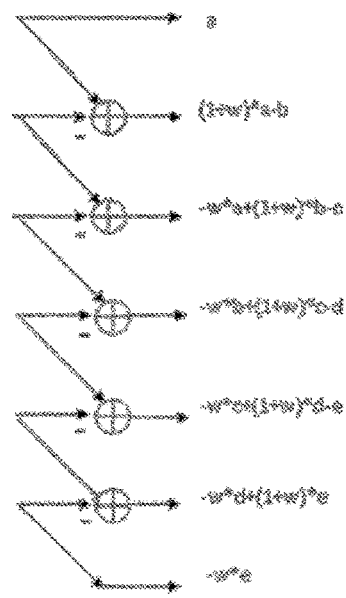

FIGS. 7a and 7b are diagrams for illustrating the structure and the parameterization of an example of a sinusoidal shaped filter respectively at transmission and at reception for generating a formatted OFDM (shaped OFDM) modulation with QAM symbols.

The example illustrated relates to N=5 symbols i.e. a, b, c, d and e. The filtering at transmission applies to N=5 symbols at the input and supplies N+1=6 samples at the output. The coefficients of the filter are $\{1, w\}$ with w a weight of weighting, $w \in [0,1]$. The structure of the filter is such that the $1^{st}$ output corresponds to the $1^{st}$ symbol, a, weighted by the $1^{st}$ coefficient, 1: a, the $n^{th}$ output is the result of the difference between the $n^{th}$ weighted symbol by the $1^{st}$ coefficient, 1, and the $(n-1)^{th}$ weighted symbol with the $2^{nd}$ coefficient, w, for $1<n \leq N$: b-w×a, c-w×b, d-w×c, e-w×d. The $(N+1)^{th}$ output corresponds to the $n^{th}$ weighted symbol with the $2^{nd}$ coefficient, w, to which the negative sign is assigned: -w×e. This structure implements the linear convolution between the input symbols a, b, c, d and e and the coefficients $\{1, w\}$ of the filter.

The value w=0 makes it possible not to have a filtering function on the QAM input symbols: each of the N=5 symbols is found intact at the output. Such a parameterization amounts to mapping the QAM symbols directly at the input of the frequency time transform which makes it possible therefore to generate a conventional OFDM signal with a formatting (filtering) function identical to a gate function. Moreover, in this case there is no longer any need of precoding since the system is orthogonal. The parameterization of the linear filter with w=0 is, for example, suitable for an MBB service.

The value w=1 makes it possible to filter with a temporal half-period sinusoidal function. The OFDM signal obtained is therefore filtered with a sinusoidal shape which improves the spectrum by reducing its frequency spread. The parameterization of the linear filter with w=1 makes it possible to construct a formatted modulation with a sinusoidal temporal profile.

The temporal shape of the filter becomes a truncated and stretched sinusoidal shape when $w \in ]0,1[$.

Thus the parameterization of the value of the coefficient w makes it possible to format the temporal shape of the transmission filter.

According to another example, the filter has the shape of a raised cosine. The cosine shape is defined over a temporal window of duration T, $k \in [0, T-1]$ equal to the size of the IFFT: T=M. The filter has a temporal expression:

$$F(k) = \begin{cases} 0.5\left(1 + \cos\left(\frac{\pi(1+k)}{\beta M/2}\right)\right) & k \in [0, (\beta M/2)-1] \\ 1 & k \in [(\beta M/2)-1, M-(\beta M/2)] \\ 0.5\left(1 + \cos\left(\frac{\pi(k)}{\beta M/2}\right)\right) & k \in \left[M-\left(\frac{\beta M}{2}\right)+1, M-1\right] \end{cases}$$

with β the "roll-off" factor. The coefficients of the frequency filter are obtained after a time frequency transformation of the temporal coefficients. Given that these coefficients have a real value, only the real values at the FFT output are considered. Moreover, only the most significant coefficients are considered. According to a first selection criterion, the method only considers the 2×L'−1 with L'=round(2/β), the most significant real values for constituting the coefficients.

Figure 8:
FIG. 8 is a diagram of the OFDM symbol constructed with QAM symbols, formatted thanks to the filter and to which the method adds a prefix at the beginning of the symbol and a prefix at the end of the symbol (postfix).

Optionally, the method adds one or more prefixes to the output symbol of the IFFT. FIG. 8 is a diagram of the OFDM symbol constructed with QAM symbols, formatted thanks to the filter and to which the method adds two prefixes, one at the beginning of the symbol and another at the end of the symbol (postfix). The prefixes are formatted. The addition of two prefixes is particularly useful when the filter has a sinusoidal shape and the coefficient w is close to zero. Indeed, they make it possible to limit the spreading of the spectrum.

At reception as illustrated in FIG. 3b, the processing is the reverse of that at transmission. The prefixes are extracted from the received signal if they have been inserted at transmission. The received symbols are then transformed into frequency symbols by means of an FFT time frequency transform. The demapper $MAP^{-1}$ at the output of the FFT reorders the symbols by extracting them from the subcarriers according to a reverse order of that at transmission. The ordered symbols are optionally filtered by a filter $FIL^{-1}$. Conventional processing then goes on to perform an estimation of the channel, an equalization of the channel and optionally a MIMO decoding. Finally, the symbols are decoded by means of a decoder DeCOD if a precoding has occurred at transmission.

The structure of the reception filter FIL illustrated in FIG. 7b applies to N+1=6 input samples and supplies N+2=7 samples at the output. The structure of the filter is such that:

the $1^{st}$ output corresponds to the $1^{st}$ sample received, i.e. the $1^{st}$ sample from the filtering at transmission which corresponds to the $1^{st}$ symbol a weighted by the $1^{st}$ coefficient, 1: 1×a=a, the $n^{th}$ output is the result of the difference between the $(n-1)^{th}$ received sample and the $(n)^{th}$ received sample, 1<n≤N+1, the $(N+2)^{th}$ output corresponds to the $N^{th}$ received sample, i.e. the $(N+1)^{th}$ sample from the filtering at transmission corresponding to the $N^{th}$ symbol weighted with the $2^{nd}$ coefficient, w, to which the negative sign is assigned: −w×e.

Figure 9:
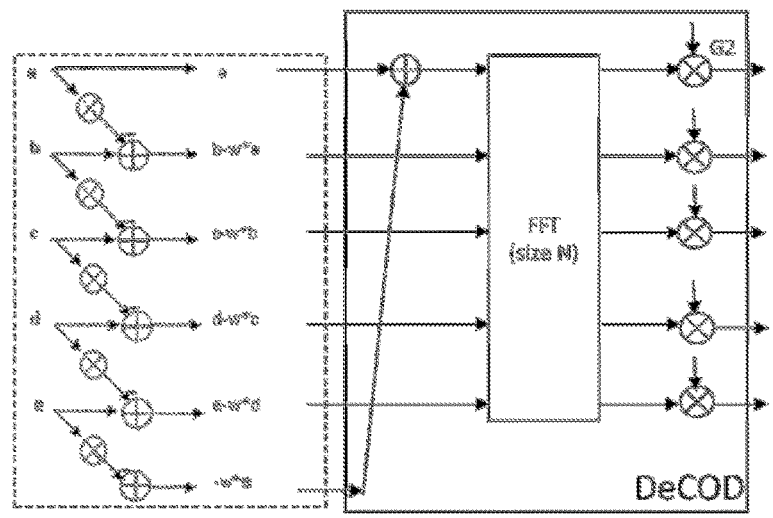
FIG. 9 is a diagram of an exemplary implementation of the symbol decoding at the receiver in the absence of a filter at reception.

In the absence of filter $FIL^{-1}$ at reception, the symbol decoding DeCOD illustrated in FIG. 9 reduces the sequence of N+1 received symbols into a sequence of N symbols and feeds the FFT with these N symbols. The box in dashed lines represents the action of the filter at transmission on the symbols. The reduction consists in adding together the first and the last symbols of the received sequence. This reduction makes it possible to construct a cyclic convulution. The result of the addition of these two symbols is then taken as the first symbol at the FFT input. At the FFT output, the symbol decoding equalizes the symbols at the FFT output by weighting the symbols with the coefficient $G2=|H_{ef}|$.

Figure 10:
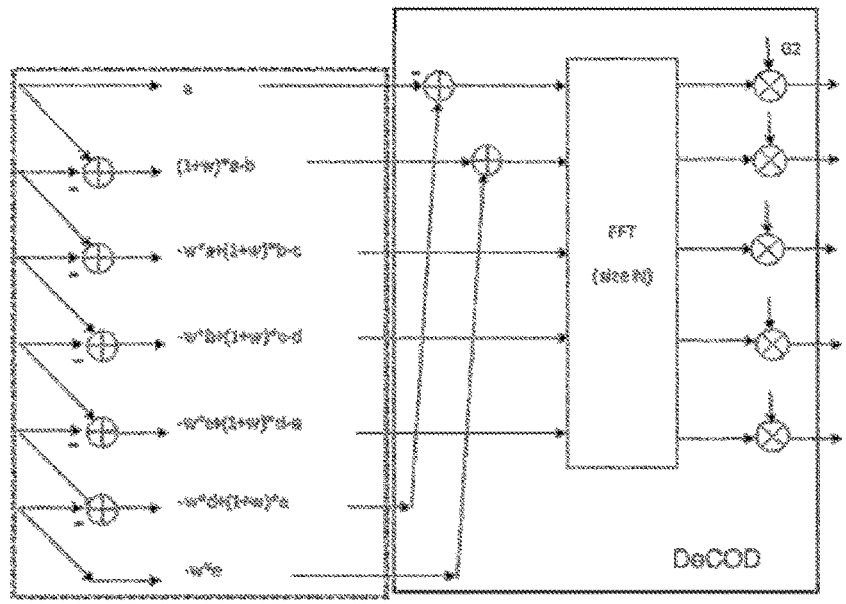
FIG. 10 is a diagram of an exemplary implementation of the symbol decoding at the receiver in the presence of a filter at reception.

In the presence of filter $FIL^{-1}$ at reception, the symbol decoding DeCOD illustrated in FIG. 10 reduces the sequence of N+2 received symbols into a sequence of N symbols and feeds the FFT with these N symbols. The box in dashed lines represents the action of the filter at transmission on the symbols. The reduction consists in subtracting the first symbol received from the penultimate symbol received and adding together the second and the last symbols of the received sequence. This reduction makes it possible to construct a cyclic convolution. The result of the subtraction is taken as the first symbol at the FFT input. And the result of the addition is taken as the second symbol at the FFT input. At the FFT output, the symbol decoding equalizes the symbols at the FFT output by weighting the symbols with the coefficient $G2=|H_{ef}|$.

Figure 11:
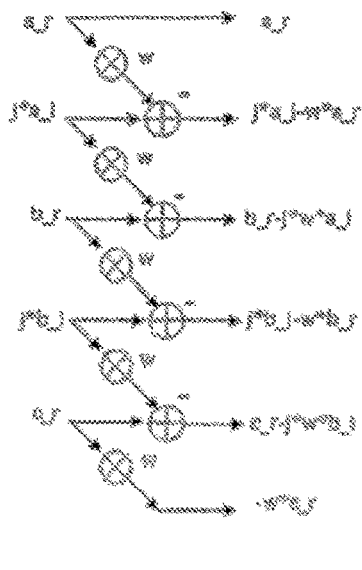
FIG. 11 is a diagram of the structure of the transmission filter for a sequence of N=5 symbols, coefficients of the filters equal to $\{1, -w\}$ and an FBMC modulation according to one embodiment of the invention.

When the modulation to be generated is an FBMC modulation, the transmission chain is identical to that previously described, in particular the filter at transmission has exactly the same structure as that illustrated in FIG. 7a. On the other hand, the symbols at the filter input are taken into account differently. This difference illustrated in FIG. 11 amounts to considering the real part and the imaginary part of each QAM symbol separately, e.g. $a=a_r+ja_i$, and to considering them in sequence. Thus by keeping the same length (N) of sequence as for FIG. 7a, the method considers that the sequence is formed of $\{a_r, ja_i, b_r, jb_i, c_r\}$ and not formed of $\{a, b, c, d, e\}$.

Pilots may be inserted into the formatted OFDM symbols generated. This insertion takes place between the precoding when it exists and the linear filtering.

Figure 12:
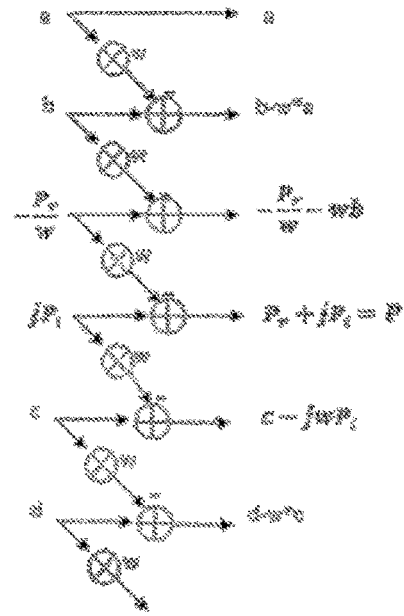
FIG. 12 is a diagram of the structure of the transmission filter for a sequence of N=5 symbols, coefficients of the filters equal to $\{1, -w\}$ with an insertion of pilots into the sequence to be filtered and an OFDM modulation according to one embodiment of the invention.

In the case of a modulation with QAM symbols, the description of the insertion of the pilots is illustrated in FIG. 12 which corresponds to the case of a sinusoidal shaped filter with coefficients $\{1, -w\}$ such that w≠0. The pilots are generally complex and may be written $P=P_r+jP_i$, with $P_r$ the real part and $P_i$ the imaginary part. The real part of the pilot is inserted into the input sequence of the filter in the form $-P_r/w$ and the imaginary part $jP_i$ is inserted afterward in the sequence. Given the structure of the filter, the pilot $P=P_r+jP_i$ is identical on one of the outputs and according to the illustration on the $4^{th}$ output.

Figure 13:
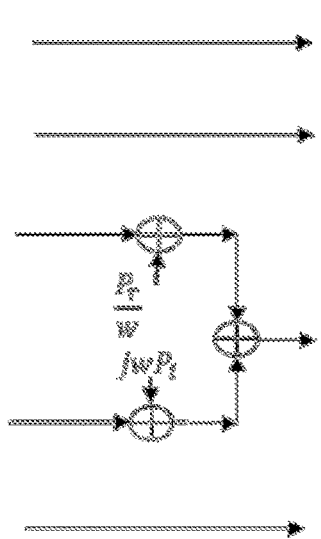
FIG. 13 is a diagram of the arrangement carried out on the received symbols when there has been an insertion of pilots at transmission in the case of an OFDM modulation according to one embodiment of the invention.

Knowing the sequence arrangement used at transmission, the receiver is capable of performing a channel estimation on the basis of the transmitted pilot $P=P_r+jP_i$. Knowing the transmitted pilot, the receiver is able, with reference to FIG. 13, to add the quantity $P_r/w$ to the third sample in the received sequence for retrieving −wb and to add the quantity $jwP_i$ to the fifth sample of the received sequence for retrieving c bearing in mind that the fourth sample, the pilot P, does not appear in the figure. By adding the two results, the receiver finds the sample c−wb that was missing from the received sequence in accordance with what is illustrated in the dashed block in FIG. 9.

Figure 14:
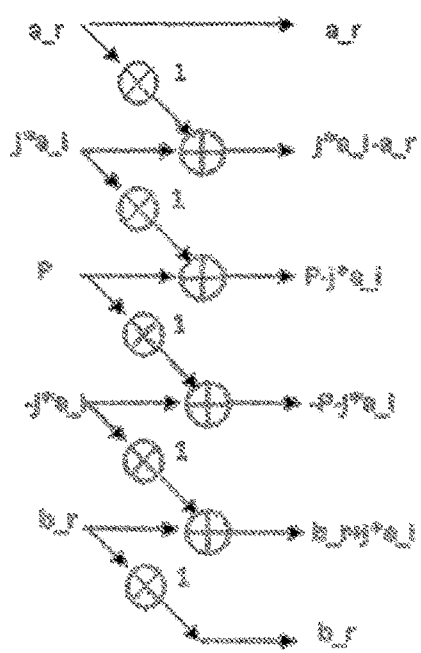
FIG. 14 is a diagram of the structure of the transmission filter for a sequence of N=5 symbols, coefficients of the filters equal to $\{1, -w\}$ with an insertion of pilots into the sequence to be filtered and an OFDM modulation with OQAM symbols according to one embodiment of the invention.
Figure 15:
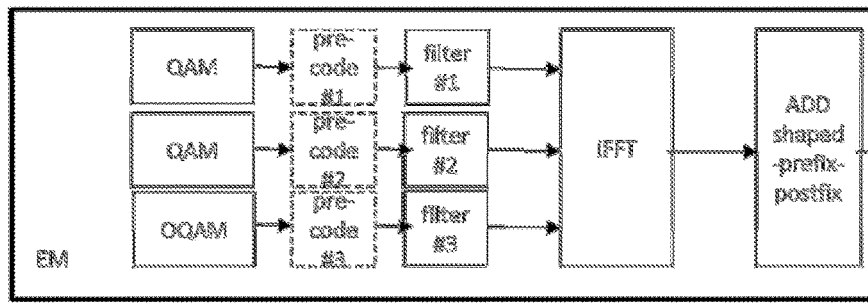
FIG. 15 is a diagram of a multiple stream transmission device with the transmission band of size M divided into sub-bands each dedicated to a communication of a given type.

In the case of a modulation with OQAM symbols, the insertion of the pilots is illustrated in FIG. 14 which corresponds to the case of a sinusoidal shaped filter with coefficients $\{1, -w\}$ such that w≠0.

Figure 16:
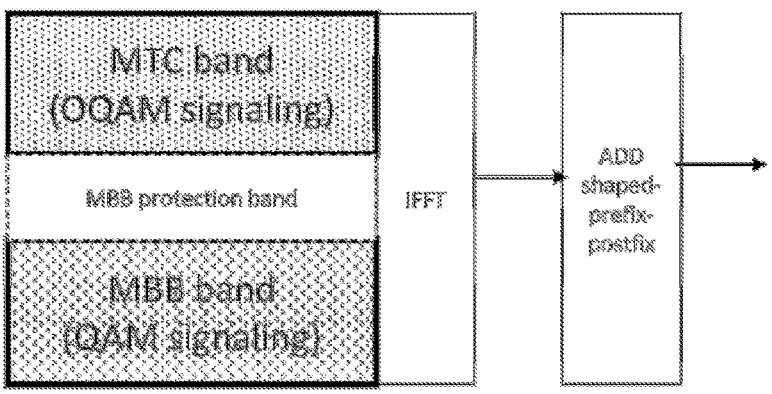
FIG. 16 is a diagram of a multiple stream transmission device with the transmission band M divided into sub-bands dedicated respectively to an MBB service and an MTC service.

According to one implementation the transmission band of size B is divided into sub-bands, the band B is given by the size of the IFFT: B=M. Each sub-band may be dedicated to a service and different services may be dedicated to different sub-bands. The sub-bands may be of a different size. A corresponding transmission device is illustrated in FIG. 16. According to the illustration, the formatted OFDM symbols at the IFFT output include symbols associated with at least three different services. Two services, e.g. MBB services, are associated with an OFDM modulation with QAM symbols and one service, e.g. V2X or MTC, is associated with an FBMC modulation with OQAM symbols. The parameterization is specific to each service. The symbols associated with a service are processed according to the processing illustrated and detailed in FIG. 3a. The only difference with respect to FIG. 3a is that the filtered symbols associated with the service are mapped onto a sub-band of the band M and not onto the total band M. The invention thus makes it possible to simultaneously transmit symbols emanating from different services and requiring conventional OFDM and FBMC modulations which is not allowed by the existing modulators. The structure provided is indeed very flexible and easily configurable.

Thus, with a transmission device constructed around a single IFFT frequency time transform and parameterizable filters of the same structure, the invention makes it possible to simultaneously transmit MBB, MTC and V2X communications. Such an embodiment is more fully described below in the case of a simultaneous transmission of an MTC service and an MBB service illustrated in FIG. 16. The MTC service is rendered with an OFDM/OQAM modulation and the MBB service is rendered with an OFDM modulation. The system therefore simultaneously processes different types of symbols, QAM and OQAM for simultaneously transmitting the MBB and MTC services. A sub-band is assigned to each of the services, "MTC band (OQAM signaling)" and "MBB band (QAM signaling)". The two sub-bands are separated by a protection sub-band "MBB protection band". This sub-band forms part of the sub-band of one of the two services so as not to lose in spectral efficiency. However, the symbols mapped onto this sub-band have a processing suitable for limiting the interference between the MTC and MBB sub-bands given the non-orthogonality between the symbols mapped onto the MTC and MBB sub-bands.

Given that the IFFT of an OFDM/OQAM modulation has a frequency of implementation twice as high as that of the IFFT of a conventional OFDM modulation, the sequence of symbols to be filtered for the OFDM modulation has to be adapted.

Figure 17:
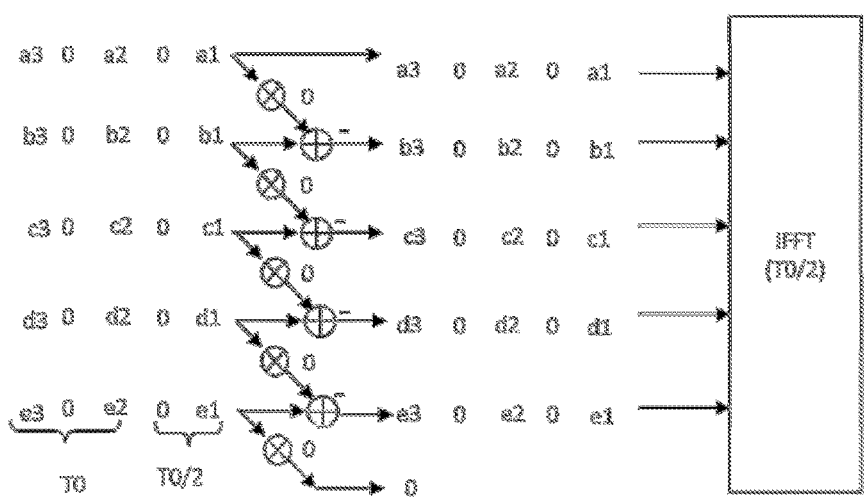
FIG. 17 is a diagram illustrating the adaptation of the sequences before filtering in the form of a temporal stretching for symbols of an MBB service.

For the QAM symbols mapped onto the MBB sub-band, one embodiment of this adaptation in the form of a temporal stretching is described in relation to FIG. 17.

The IFFT which is common to the conventional OFDM and OFDM/OQAM modulations is implemented with the highest frequency, i.e. 2/T0. The symbols to be filtered for the conventional OFDM modulation arrive in sequence/block with a frequency of 1/T0. The sequences must therefore be stretched for being transformed with the IFFT at the frequency 2/T0. The simplest stretching consists in inserting a sequence of null symbols between each sequence of symbols to be filtered. The parameterization of the filter is such that the coefficients are $\{1, 0\}$ for obtaining a conventional OFDM modulation.

According to the described embodiment, the protection band is taken in the sub-band allocated to the MBB service.

Figure 18:
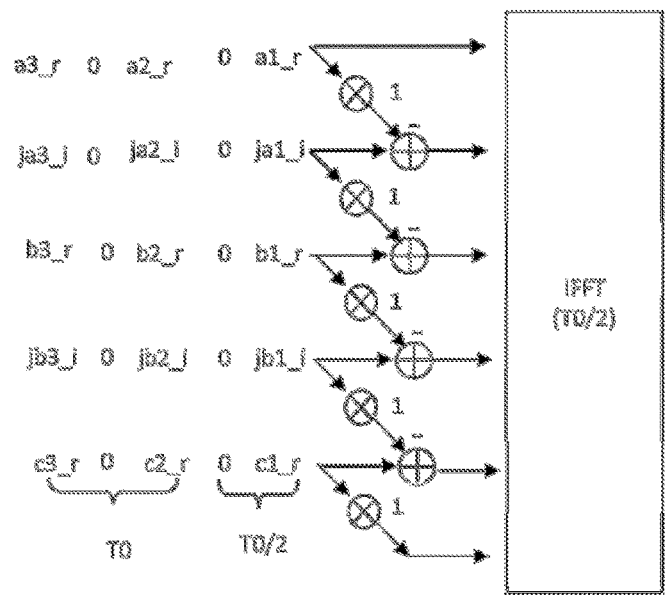
FIG. 18 is a diagram illustrating the adaptation of the mapped symbols in the protection sub-band with OQAM symbols and a half rate.
Figure 19:
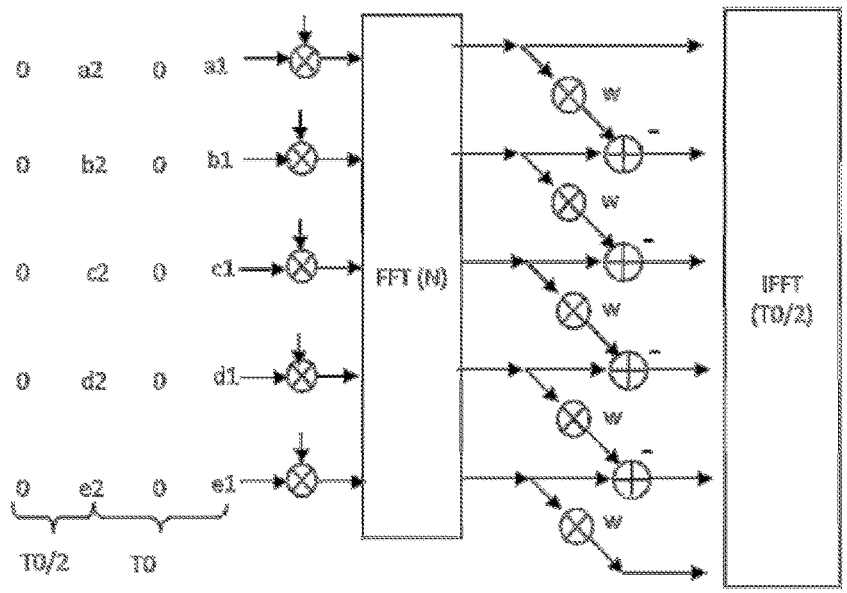
FIG. 19 is a diagram illustrating the adaptation of the mapped symbols in the protection sub-band with QAM symbols and a full rate.

The QAM symbols mapped in the protection sub-band may be adapted according to two possibilities. According to the first possibility illustrated in FIG. 18, the method uses OQAM symbols with a half rate. The QAM input symbols are therefore put in sequences to be processed as OQAM symbols but with a half rate, i.e. T0. Two successive sequences are separated by a sequence of zeros. The coefficients of the filter are $\{1, -w\}$, with w=1. According to the second possibility illustrated in FIG. 19, the method uses QAM symbols with a full rate and a filter of coefficients $\{1, -w\}$, with 0<w<1. A precoding is then necessary.

The first possibility does not require any precoding which makes it possible for the receiver to detect the symbols directly after the IFFT and for the detector to benefit from the frequency diversity of the channel. But the half rate causes spectral efficiency to be lost on the protection sub-band. The second possibility provides a better spectral efficiency but requires a precoding. This then calls for a symbol decoding on the receiver before detection which does not allow the detector to benefit from the frequency diversity of the channel. The two possibilities each allow the receiver to efficiently filter the received symbols for reducing the interference between the MBB and MTC sub-bands.

For the OQAM symbols mapped onto the MTC sub-band, the QAM input symbols are put in sequences for being processed as OQAM symbols. They therefore arrive before filtering in sequence at the rate of T0/2 since the real part and the imaginary part of each symbol are considered in series in the sequences to be filtered as illustrated in FIG. 20. There is no rate adaptation. The parameterization of the filter is such that the coefficients are $\{1, -1\}$ for obtaining an OFDM/OQAM modulation.

The output of the IFFT therefore supplies every T0 a signal that combines the MTC and MBB services and every T0+T0/2 a signal composed only of the MTC service. The width of the protection band is a parameter of the system and depends on the power offset between the MBB and MTC services. For example, if this offset is zero then only a few subcarriers are necessary for the protection sub-band.

Every T0, the method adds a cyclic prefix CP formatted at the beginning and at the end of the IFFT output symbol, as illustrated in FIG. 21. The cyclic prefix CP added at the beginning of the IFFT output symbol is a copy of the last L samples of the M samples of the symbol. The cyclic prefix CP added at the end of the IFFT output symbol is a copy of the first L samples of the M samples of the symbol. The cyclic prefixes are formatted with a window of a particular shape. The symbol thus constituted is denoted by US-OFDM; it appears at a rate of T0.

Every T0+T0/2, the method adds a prefix formatted according to a concatenation different from that previously described. The concatenation is illustrated in FIG. 22. The IFFT output symbol benefits from a well localized spectrum taking into account the filtering $\{1, -1\}$ of the OFDM/OQAM modulation. There is therefore no need to add cyclic prefixes at the edges of the symbol. For reasons of orthogonality, the method inserts two cyclic prefixes in the middle of the symbol of length M. Thus, the method inserts a copy of the last L samples of the first part of M/2 samples of the symbol at the beginning of the second part of M/2 samples. The method further inserts a copy of the first L samples of the second part of M/2 samples of the symbol at the end of the first part of M/2 samples. The method formats these copies so that the middle samples equal zero.

The method then proceeds to a summation with overlapping between consecutive symbols as illustrated in FIG. 23. The overlapping consists of $$\frac{M}{2} + L$$

samples. Thus, a symbol at T0, i.e. combining MTC and MBB services, is added together with the next symbol at T0+T0/2, i.e. which consists only of the MTC service. This addition takes place only between the last part of length $$\frac{M}{2} + L$$

of the symbol at T0 and the first part of the symbol at T0+T0/2 of length $$\frac{M}{2}+L.$$

Similarly, a symbol at T0+T0/2 is added together with the next symbol at 2T0 over an overlapping length of $$\frac{M}{2}+L$$

samples. And so on for the different symbols.

[3GPP] "Motivation for new WI on Low Complexity and Enhanced Coverage LTE UE for MTC", 3GPP TSG RAN Meeting #64 RP-140845, Sophia Antipolis, France, 10-13 Jun. 2014

[Bellanger] FBMC physical layer: a primer", M. Bellanger, PHYDYAS, June 2010

The invention claimed is:

1. A multiple stream transmission method performed by a telecommunication device, comprising:
    transmitting symbols corresponding to different types of communications including a sporadic type and a cellular type by a multiple stream telecommunication device, wherein transmitting comprises:
    implementing a multicarrier modulation whatever the communication type using a same frequency time transform associated with a band of size M, N<M, and a linear frequency filtering using a filter, of a sequence of length N comprising symbols, with L coefficients that are parameterizable according to the communication type, L, N and M being natural numbers, for generating N+L 1 symbols, and wherein multiple sequences of symbols are processed in parallel with a parameterization of the filtering for each different communication type associated with the sequences and the filtered sequences are mapped to an input of the frequency time transform each on a sub-band, and wherein the number of symbols can be different between the sequences, and wherein the coefficients of the filter are equal to {1, −w} with w∈[0,1], L=2.

2. The method as claimed in claim 1, in which the filtered symbols are mapped to the input of the frequency time transform and in which, during a framing, a first and a second formatted cyclic prefix are added to a multicarrier symbol obtained at an output of the transform.

3. The method as claimed in claim 2, in which the N symbols are precoded before being filtered, the precoding preequalizing a phase shift effect of the filtering.

4. The method as claimed in claim 1, in which w=0, in which the symbols to be transmitted are complex and in which the sequence of length N is composed of N complex symbols to be transmitted.

5. The method as claimed in claim 4, in which the filtered symbols are mapped to the input of the frequency time transform and in which the method further includes mapping pilots to the input of the frequency time transform.

6. The method as claimed in claim 1, in which w≠0, in which the symbols to be transmitted are complex and the sequence of length N is composed of successions of the real part and the imaginary part of the symbols to be transmitted.

7. The method as claimed in claim 6, in which the method further includes an insertion of complex pilots into the sequence of N symbols before the filtering such that for the same pilot of form $P_r+jP_i$ its real part $P_r$ is inserted in the form $-P_i/w$ and its imaginary part is inserted thereafter in the form $jP_i$.

8. The method as claimed in claim 1, including transmitting a signaling message encoding the parameterization.

9. A multiple stream telecommunication device for symbols to be transmitted corresponding to different types of communications including sporadic type or cellular type implementing a frequency time transformation, wherein the device comprises:
    a processor, which is configured to process multiple sequences of symbols in parallel with a number of symbols which can be different between the sequences, and which includes as many linear frequency filters with L parameterizable coefficients according to the communication type as sequences in parallel for generating N+L−1 symbols from a sequence of length N including symbols and includes a common frequency time transformer of band M whatever the communication type, L, N and M being natural numbers, N<M, and the filtered sequences are mapped to the input of the transformer each on a sub-band, and wherein the coefficients of the filters are equal to {1, −w} with w∈[0,1], L=2.

10. A multiple stream telecommunication reception method performed by a telecommunication receiver, comprising:
    receiving symbols corresponding to different types of communications, including sporadic type or cellular type,
    implementing a multicarrier modulation with M subcarriers, using a same time frequency transform of size M and, under control of a received signaling message encoding a parameterization used in transmission, and using a linear frequency filtering, which is an inverse of a linear filtering used in transmission,
    in which the coefficients of the filter in transmission are equal to {1, −w} with w∈[0,1], L=2.

11. A multiple stream telecommunication receiver for symbols corresponding to different types of communications, including a sporadic type or a cellular type implementing a multicarrier modulation with M subcarriers, wherein the receiver comprises a same time frequency transform of size M and, under control of a received signaling message encoding a parameterization used in transmission, a linear frequency filter, which is an inverse of a linear filter used in transmission and wherein the coefficients of the linear frequency filter in transmission are equal to {1, −w} with w∈[0,1], L=2.

* * * * *

UNITED STATES PATENT AND TRADEMARK OFFICE
CERTIFICATE OF CORRECTION

PATENT NO. : 10,432,442 B2  
APPLICATION NO. : 15/739559  
DATED : October 1, 2019  
INVENTOR(S) : Hao Lin Page 1 of 1

It is certified that error appears in the above-identified patent and that said Letters Patent is hereby corrected as shown below:

In the Specification

Column 2, Lines 33 to 38, the equations should appear as follows:

$$s(t) = \frac{1}{\sqrt{T_0}} \sum_{m=0}^{M-1} \sum_{n=-\infty}^{\infty} c_{m,n} f(t - nT_0) e^{j2\pi m F_0 t}$$ with $$f(t) = \Pi(t) = \begin{cases} 1 \text{ if } -\frac{T_0}{2} \leq t < \frac{T_0}{2} \\ 0 \text{ else} \end{cases}$$

Column 7, Lines 27 to 28, the equation should appear as follows:

$$y_k = \sum_{l=0}^{L-1} f_l \times a_{k-l}$$ with $f_l$ the coefficients of the filter, $l \in [0, L-1]$ Signed and Sealed this  
Twenty-eighth Day of July, 2020

Andrei Iancu  
*Director of the United States Patent and Trademark Office*